Patented Feb. 4, 1936

2,029,312

UNITED STATES PATENT OFFICE 2,029,312

DYESTUFFS AND THEIR APPLICATION

George Holland Ellis and Frank Brown, Spondon, near Derby, England, assignors to Celanese Corporation of America, a corporation of Delaware No Drawing. Application February 7, 1933, Serial No. 655,613. In Great Britain February 17, 1932

10 Claims. (Cl. 8—5)

This invention relates to the colouration of cellulose ester and ether and other materials and to the production of new dyestuffs.

The amino and simple alkylamino derivatives of anthraquinone, for example 1:4-dimethylamino anthraquinone, are of considerable value for the colouration of cellulose ester and ether materials in that by their aid it is possible to secure by direct dyeing methods shades of blue difficult to secure by means of other direct dyeing dyestuffs. Many of these dyeings, however, while reasonably fast to most of the agencies which textile materials are commonly required to withstand, suffer from a lack of resistance to the combined action of light and acid, for instance combustion products of coal gas. This lack of resistance is particularly objectionable in that in general it involves a considerable change in shade towards red and not merely a reduction in the intensity of the dyeing. A considerable improvement in respect to resistance to the combined action of acid and light may be effected in the case of amino anthraquinone derivatives by introducing an aryl residue into one or more amino groups. The dyestuffs thus obtained offer extremely good resistance to acid and light, but unfortunately their affinity for cellulose ester and ether materials is often so low as to render them of little commercial value except possibly for the production of pale shades.

We have now found that the introduction of alkyl groups or other substituents into meta positions of arylamino residues of arylamino anthraquinones is capable of effecting a marked improvement in the affinity of these compounds for cellulose ester and ether materials. Thus, for example, as compared with 1-hydroxy-4-phenylamino anthraquinone and 1-amino-4-phenylamino-anthraquinone the corresponding m-tolylamino compounds exhibit a marked increase in affinity for cellulose esters and ethers. Moreover, this affinity is not obtained at the expense of material reduction in the resistance of the dyestuffs to the combined agencies of acid and light. It appears that the introduction of an alkyl group or other substituent, especially a substituent of relatively low mass, into a meta position of an aryl residue of an arylamino-anthraquinone increases the affinity of the compound for cellulose esters and ethers.

Broadly, therefore, our invention comprises the colouration of cellulose ester or ether or other materials by means of arylamino anthraquinone derivatives substituted in a meta position of at least one aryl residue by an alkyl group or other substituent. The invention also comprises new anthraquinone dyestuffs containing arylamino groups substituted in meta positions of the aryl residues.

The m-substituents, for example methyl groups, alkoxy or other ether groups, or acidylamino groups, may be accompanied in the aryl groups by substituents in other positions, which may be of the same kind or of different kinds, for example halogen or nitro groups where the m substituent is one of the foregoing.

The meta-substituents are advantageously of comparatively inert character and not of negative or salt-forming character, as in the case of alkyl or alkyloxy or other groups having in general but little auxochromic effect in dyestuffs.

The aryl groups may be of any desired series, for example of the naphthalene series. Preferably however the aryl groups are of the benzene series.

Particularly valuable colouring matters are those containing m-substituted arylamino groups in α-positions of the anthraquinone nucleus, especially when in conjunction with hydroxy, amino, or aliphatically substituted amino groups in para positions thereto. Other substituents in these positions or substituents in other positions may be present if desired. As examples of specific dyestuffs mention may be made, in addition to 1-hydroxy-4-m-tolylamino-anthraquinone and 1 - amino-4-m-tolylamino - anthraquinone, of 1-methylamino - 4 - m - tolylamino-anthraquinone, 1:5-diamino-4:8-di-m-tolyamino-anthraquinone, 1:8-dihydroxy-4-m-tolylamino-anthraquinone, 1-amino-5-m-tolylamino - 4 : 8-dioxyanthraquinone, 1 - amino - 4 - m - tolylamino - 5 - hydroxy-anthraquinone, 1-amino-4-(5'-methyl-2'-methoxy-phenylamino)-anthraquinone, 1-hydroxy- or 1 - amino - 4-(3'-methyl-4'-acetylamino-phenylamino) - anthraquinone, 1 - amino - 4 - (2' : 5' - dimethylphenylamino) - anthraquinone, and 1 - amino-4-(3': 5'-dimethyl-phenylamino)-anthraquinone.

Where two or more arylamino groups are present in the dyestuff molecule, meta substituents may be present in one or more than one of them. Further, the arylamino residues may be identical or they may differ one from the other either in respect of the nucleus or in respect of their mode of substitution. Thus, for instance, in the case of a diarylamino compound one aryl residue may contain a meta alkyl group or groups, while the other may be unsubstituted or substituted for instance by an ortho alkoxy group or an acidyl amino group.

Any desired methods may be employed for the production of these arylamino anthraquinone substituted in the meta positions of aryl residues by alkyl or other groups, for example, any of the known methods of synthesizing arylamino anthraquinone derivatives. Thus, reactive groups present as substituents in anthraquinone derivatives may be replaced by arylamino residues of the desired character by the action of appropriate meta-methyl or other meta substituted aromatic amines, for example m-anisidine, m-toluidine, p-xylidine, sym-xylidine, 3-amino-4-methoxy-1-methylbenzene, and mono-acetyl-p-toluylene-diamine. Again, amino anthraquinones may be subjected to the action of agents capable of introducing into an amino group an aryl residue substituted in the desired manner.

As examples of atoms or groups readily replaceable by arylamino residues mention may be made of nitro, hydroxy, amino, chlorine or other halogen atoms and sulphonic groups. As examples of specific compounds containing such reactive atoms or groups reference may be made to 1-amino-4-hydroxy or alkoxy anthraquinone, 1-amino-4-nitro-anthraquinone, 1:5-dinitro-4:8-diamino-anthraquinone, 1:8-dinitro-4:5-diamino-anthraquinone, 1-amino-4-brom-anthraquinone, 1-hydroxy-4-chlor- or 4-brom-anthraquinone, 1:4-dihydroxy-anthraquinone, 1:5- or 1:8-dinitro-anthraquinone, 4-nitro-chrysazin, or 4-nitro-anthrarufin, 4-chlor-chrysazin or 4-chlor-anthrarufin, dinitro-chrysazin, dinitro-anthrarufin, 1:5- or 1:8-dichlor-anthraquinone or their 4-amino derivatives and 5:8-dichlor-1:2-benzanthraquinone. 1-amino-4-m-tolylamino-anthraquinone may be conveniently obtained by the action of an excess of m-toluidine on 1-amino-4-methoxy-anthraquinone. It dyes bright blue shades on cellulose acetate.

In addition to replacing one or more reactive groups by meta substituted arylamino residues other of the reactive groups may be replaced by or converted into other substituents before or after the introduction of the arylamino residue. Thus, for instance reactive substituents may be replaced by or converted into primary amino groups or alkyl or substituted alkylamino groups, e. g. hydroxyalkylamino groups. For example a nitro group may be reduced to a primary amino group or a nitro group, hydroxyl group, or halogen atom replaced by an amino or aliphatically substituted amino group by the action of ammonia or an aliphatic amine, e. g. methylamine or hydroxyethylamine.

The replacement of hydroxyl groups by amino or hydroxyl and amino groups by substituted amino groups by the direct action of ammonia or substituted ammonias may frequently be facilitated by first reducing the anthraquinone compound to a leuco derivative. Such is especially the case when compounds contain hydroxyl or hydroxyl and amino groups in the 1:4-positions. The amidation of reduced hydroxy anthraquinone compounds may if desired be effected in the presence of inorganic alkali in the manner described in U. S. application S. No. 331,390 filed 9th January, 1929.

Substituents in the arylamino residues, whether in the meta positions characteristic of the invention or otherwise, may if desired be introduced into the aryl residues of already prepared arylamino-anthraquinones, or substituents already present may be converted into other and more desirable substituents. For example nitro groups may be introduced by direct nitration, or nitro groups may be reduced, or amino groups alkylated or acylated, or halogen atoms replaced by alkoxy groups by the action of sodium alcoholates, or hydroxyl groups esterified.

If desired the new colouring matters may contain sulphonic groups or may be subjected to sulphonation, for example where it is desired to produce dyestuffs for animal fibres.

The new colouring matters, as indicated above, are of especial value, particularly when unsulphonated, for the colouration of cellulose acetate and other cellulose ester or ether materials. As examples of such other esters and ethers reference may be made to cellulose formate, propionate or butyrate or the products obtainable by treating alkalized cellulose with esterifying agents, or the ethyl, benzyl or other ethers of cellulose. They may also be applied to mixed materials comprising one or more of the aforesaid cellulose esters or ethers in admixture with other textile fibres, for example wool, silk or other animal fibres, or cotton, regenerated cellulose or other cellulosic materials. Such other fibres may be coloured by the same dyestuffs as the cellulose esters or ethers when they possess the requisite affinity, or they may be coloured either in the same or different shades by means of other dyestuffs, either before, after or simultaneously with the colouration of the cellulose esters or ethers.

The said colouring matters may be applied to textile materials either in the reduced state, that is by a vat process or in the form of free leuco compounds in the manner described in U. S. application S. No. 459,828, filed 5th June, 1930, or they may be applied in solution where sufficiently soluble, in aqueous suspension, or after being brought into colloidal form.

For convenience in application, the new colouring matters may be converted into concentrated or other preparations, whether liquid or solid or semi-solid, in which the colouring matters are present in the reduced or unreduced state and in colloidal, dispersed, or other finely divided condition. Such preparations are included within the scope of the invention and may be prepared for example, by grinding (e. g. in colloid mills), by dissolving in a solvent and mixing with water containing or not containing protective colloids and/or dispersators, or by treatment with dispersing agents whether alone or in the presence of protective colloids and/or liquids e. g. water. Preparations intended for vatting may contain reducing agents, alkali or the like, e. g. alkali salts of hydroxy and polyhydroxy cyclic compounds (see U. S. Patent No. 1,716,720). As examples of dispersing agents or protective colloids mention may be made of the following:—

Sulphoaromatic fatty acid compounds, e. g. sulphobenzene palmitic acid compounds (see U. S. Patent No. 1,694,413).

Sulphoaromatic ricinoleic acid compounds, e. g. sulphonaphthalene-ricinoleic acid, (see U. S. Patent No. 1,840,572).

Naphthenic acids or other carbocyclic compounds containing salt-forming groups or salts of such acids or compounds (see U. S. Patent No. 1,618,414).

Sulphonated oil compounds, e. g. sulphonated castor oil.

Sulphuric esters of higher aliphatic alcohols.

Furfural-naphthalene sulphonic acid compounds (see U. S. application S. No. 390,423, filed 4th September, 1929).

Resino-naphthalene sulphonic acid compounds (see U. S. application S. No. 390,424, filed 4th September, 1929).

Formaldehyde naphthalene sulphonic acid compounds.

Alkyl-, cycloalkyl-, and aralkyl-naphthalene sulphonic acids.

Sulphite cellulose waste liquor or its constituents or products of transformation, e. g. ligninsulphonic acid compounds.

Sulphonic acid compounds of mineral oils, tar oils, brown coal tar oils, and the like, and their products of condensation with alcohols.

Sulphonic acid compounds of distillation residues of benzaldehyde.

Carbohydrates including gums.

Glue and gelatine.

By addition of or dilution with water, the aforesaid preparations containing unreduced colouring matters yield aqueous suspensions or colloidal solutions which may be directly employed for the colouration of cellulose acetate or other organic substitution derivatives of cellulose. The preparations containing reduced or unreduced colouring matters may be employed for the preparation of dye vats for the colouration of cellulose acetate or other organic substitution derivatives of cellulose or other textile materials.

The colouring matters may be applied to the materials in any desired manner, for example by dyeing or other method of uniform application, or by printing, stencilling or other method of local application. If desired the new colouring matters may be employed for the colouration of stannous chloride discharges in the manner described in U. S. application S. No. 518,897, filed 27th February, 1931.

The invention is illustrated but not limited by the following examples:—

EXAMPLE 1

*Preparation of 1-amino-4-metatolyl-aminoanthraquinone*

1 part of 1-amino-4-methoxyanthraquinone is heated with 2 parts of metatoluidine and 2 parts of dimethylaniline as diluent at 160–170° C. until no further formation of blue dyestuff is observed. After cooling, an equal volume of methyl alcohol is added whereby the new dyestuff is precipitated in crystalline form. The product is now filtered, washed with alcohol and dried.

EXAMPLE 2

*Preparation of 1-amino-4-(3':6'-dimethyl phenylamino)-anthraquinone*

1 part of 1-amino-4-methoxyanthraquinone is heated with 4 parts of p-xylidine at 160–170° C. till no more formation of blue dyestuff is observed. After cooling an equal volume of methyl alcohol is added, whereby the dyestuff is precipitated in crystalline form. It is filtered off, washed with methyl alcohol, and dried.

EXAMPLE 3

To dye 10 kilograms of cellulose acetate knit fabric a bright blue shade:—

1 kilogram of a 10% aqueous paste of finely divided 1-amino-4-metatolylaminoanthraquinone is heated to the boil with 10 litres of 2.5 g. p. l. soap solution, with stirring, and strained through a filter cloth into a dyebath containing 300 litres of 2.5 g. p. l. soap solution. The previously scoured cellulose acetate fabric is now entered in rope form, and dyeing commenced cold or luke warm, the temperature being raised slowly to 80° C. and maintained thereat for 1½ hrs. or till the requisite shade is achieved. The goods are now washed off thoroughly and dried or otherwise treated as desired or requisite.

For printing cellulose acetate goods the dyestuff paste is suitably diluted and thickened with a gum thickening paste which may also contain swelling agents for the cellulose acetate, e. g. methylated spirits. Printing, drying, steaming, etc. may then be effected according to known technique.

What we claim and desire to secure by Letters Patent is:—

1. Process for the coloration of organic derivatives of cellulose which comprises applying thereto an unsulphonated anthraquinone compound having as a substituent in the anthraquinone nucleus a phenylamino radicle having an alkyl group as a meta substituent.

2. Process for the coloration of organic derivatives of cellulose which comprises applying thereto an unsulphonated anthraquinone compound having as a substituent in an alpha position of the anthraquinone nucleus a phenylamino radicle having an alkyl group as a meta substituent.

3. Process for the coloration of cellulose acetate which comprises applying thereto an unsulphonated anthraquinone compound having as a substituent in the anthraquinone nucleus a phenylamino radicle having an alkyl group as a meta substituent.

4. Process for the coloration of cellulose acetate which comprises applying thereto an unsulphonated anthraquinone compound having as a substituent in an alpha position of the anthraquinone nucleus a phenylamino radicle having an alkyl group as a meta substituent.

5. Process for the coloration of cellulose acetate which comprises applying thereto an unsulphonated anthraquinone compound having an m-tolylamino group as a substituent in an alpha position of the anthraquinone nucleus.

6. Process for the coloration of cellulose acetate which comprises applying thereto an unsulphonated anthraquinone compound having an amino group in the 1-position, and in the 4-position a phenylamino radicle having an alkyl group as a meta substituent.

7. Process for the coloration of cellulose acetate which comprises applying thereto an unsulphonated anthraquinone compound having an alkylamino group in the 1-position, and in the 4-position a phenylamino radicle having an alkyl group as a meta substituent.

8. Process for the coloration of cellulose acetate which comprises applying thereto an unsulphonated anthraquinone compound having a hydroxyl group in the 1-position, and in the 4-position a phenylamino radicle having an alkyl group as a meta substituent.

9. Process for the coloration of cellulose acetate which comprises applying thereto 1-amino 4-m-tolylamino anthraquinone.

10. Process for the coloration of cellulose acetate, which comprises subjecting cellulose acetate to the action of an aqueous dispersion of 1-amino-4-meta-tolylamino-anthraquinone.

GEORGE HOLLAND ELLIS.
FRANK BROWN.